(12) United States Patent
Valeri et al.

(10) Patent No.: US 10,611,323 B2
(45) Date of Patent: Apr. 7, 2020

(54) ENGINE SOUND ENHANCEMENT SYSTEMS AND METHODS FOR GEAR SHIFTS

(71) Applicant: GM Global Technology Operations LLC, Detroit, MI (US)

(72) Inventors: Frank C. Valeri, Novi, MI (US); Glenn Pietila, Howell, MI (US); Richard I. Chang, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 15/899,515

(22) Filed: Feb. 20, 2018

(65) Prior Publication Data

US 2019/0256016 A1 Aug. 22, 2019

(51) Int. Cl.
| | |
|---|---|
| *B60R 16/023* | (2006.01) |
| *B60Q 9/00* | (2006.01) |
| *B60K 35/00* | (2006.01) |
| *H04R 1/02* | (2006.01) |
| *H04R 3/00* | (2006.01) |
| *G10K 15/02* | (2006.01) |
| *G06N 5/02* | (2006.01) |
| *H04R 29/00* | (2006.01) |

(52) U.S. Cl.
CPC ........ *B60R 16/0231* (2013.01); *B60K 35/00* (2013.01); *B60Q 9/00* (2013.01); *G06N 5/022* (2013.01); *G10K 15/02* (2013.01); *H04R 1/025* (2013.01); *H04R 3/00* (2013.01); *H04R 29/001* (2013.01); *B60K 2370/50* (2019.05); *B60Y 2306/11* (2013.01); *H04R 2499/13* (2013.01)

(58) Field of Classification Search
CPC ...... B60R 16/0231; B60Q 9/00; B60K 35/00; B60K 2370/50; B60Y 2306/11; H04R 1/025; H04R 3/00; H04R 29/001; H04R 2499/13; G10K 15/02; G06N 5/022
See application file for complete search history.

(56) References Cited

U.S. PATENT DOCUMENTS

| | | | |
|---|---|---|---|
| 6,859,539 B1 * | 2/2005 | Maeda ...................... | H04R 5/04 381/163 |
| 9,065,403 B2 * | 6/2015 | Takahashi .............. | B60Q 5/008 |

(Continued)

OTHER PUBLICATIONS

Chang, Richard I. et al., U.S. Appl. No. 15/220,912, entitled "Predictive Tachometer Profile Generation During Transmission Shift Events," filed Jul. 27, 2016; 41 pages.

(Continued)

*Primary Examiner* — Dale W Hilgendorf
*Assistant Examiner* — Alexander C. Bost

(57) ABSTRACT

An audio system of a vehicle includes a selection module configured to, based on whether a gear shift of a transmission of the vehicle is occurring, set a selected torque to one of: a torque output of an engine of the vehicle; and a predicted torque output of the engine. A sound control module is configured to: determine frequencies for outputting a predetermined engine sound; and based on the selected torque, determine magnitudes for outputting the predetermined engine sound at the frequencies, respectively. An audio driver module is configured to apply power to speakers to output sound within a passenger cabin of the vehicle at the magnitudes and frequencies, respectively.

19 Claims, 4 Drawing Sheets

(56) References Cited

U.S. PATENT DOCUMENTS

| | | | | |
|---|---|---|---|---|
| 9,311,910 | B2* | 4/2016 | Hera | G10K 11/18 |
| 9,478,214 | B2* | 10/2016 | Orth | G10K 15/02 |
| 9,574,472 | B1* | 2/2017 | Dufford | F01N 1/168 |
| 9,966,057 | B1* | 5/2018 | Wang | F02N 11/0814 |
| 10,195,902 | B1* | 2/2019 | Lee | H04R 3/04 |
| 10,384,599 | B2* | 8/2019 | Tanaka | B60L 3/12 |
| 2008/0192954 | A1* | 8/2008 | Honji | G10K 15/04 |
| | | | | 381/86 |
| 2010/0166210 | A1* | 7/2010 | Isozaki | B60L 3/00 |
| | | | | 381/86 |
| 2010/0208915 | A1* | 8/2010 | Lipp | G10K 15/02 |
| | | | | 381/86 |
| 2011/0085674 | A1* | 4/2011 | Fujikawa | G10K 15/02 |
| | | | | 381/86 |
| 2011/0087403 | A1* | 4/2011 | Fujikawa | G10K 15/02 |
| | | | | 701/36 |
| 2012/0106748 | A1* | 5/2012 | Peachey | B60Q 5/00 |
| | | | | 381/61 |
| 2014/0229076 | A1* | 8/2014 | Doering | F16H 63/42 |
| | | | | 701/48 |
| 2015/0117670 | A1* | 4/2015 | Lee | G10K 15/02 |
| | | | | 381/86 |
| 2015/0197195 | A1* | 7/2015 | Hera | B60Q 9/00 |
| | | | | 381/86 |
| 2015/0199955 | A1* | 7/2015 | Draganic | G10K 15/02 |
| | | | | 381/86 |
| 2017/0043713 | A1* | 2/2017 | Sun | B60Q 5/00 |
| 2017/0123754 | A1* | 5/2017 | Kwon | G05B 15/02 |
| 2018/0070191 | A1* | 3/2018 | Chang | H04R 3/00 |
| 2019/0111839 | A1* | 4/2019 | Lee | G06N 20/00 |
| 2019/0176695 | A1* | 6/2019 | Tanaka | G10K 15/02 |

OTHER PUBLICATIONS

Chang, Richard I. et al., U.S. Appl. No. 15/234,723, entitled "Predictive Tachometer Profile Generation During Idle Rewing Events," filed Aug. 11, 2016; 35 pages.

Chang, Richard I. et al., U.S. Appl. No. 15/264,844, entitled "Tachometer Profile Generation During Idle Rewing Events," filed Sep. 14, 2016; 32 pages.

* cited by examiner

ENGINE SOUND ENHANCEMENT SYSTEMS AND METHODS FOR GEAR SHIFTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle audio systems and methods and more particularly to engine sound enhancement control systems and methods for vehicles based on predicted engine torque output.

Some motor vehicles include conventional powertrains having an internal combustion engine and a drivetrain that normally emit sounds during acceleration events, deceleration events, and gear changes. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle.

Some motor vehicles include hybrid electric powertrains including an internal combustion engine and one or more electric motors and/or motor generator units (MGUs). Sound produced by hybrid electric powertrains may be different than the sound produced by conventional powertrains.

SUMMARY

In a feature, an audio system of a vehicle includes a selection module configured to, based on whether a gear shift of a transmission of the vehicle is occurring, set a selected torque to one of: a torque output of an engine of the vehicle; and a predicted torque output of the engine. A sound control module is configured to: determine frequencies for outputting a predetermined engine sound; and based on the selected torque, determine magnitudes for outputting the predetermined engine sound at the frequencies, respectively. An audio driver module is configured to apply power to speakers to output sound within a passenger cabin of the vehicle at the magnitudes and frequencies, respectively.

In further features, a predicted torque module is configured to set the predicted torque to the torque output of the engine during an upshift of the transmission until the torque output of the engine decreases. The selection module is configured to set the selected torque to the predicted torque output of the engine during the upshift.

In further features, the predicted torque module is configured to, when a decrease in the torque output of the engine is greater than a predetermined decrease, adjust the predicted torque by a rate of change of the torque output of the engine from before the torque output of the engine began to decrease.

In further features, the predicted torque module is configured to adjust the predicted torque by the rate of change of the torque output of the engine until a rate of change of a speed of the engine decreases.

In further features, the predicted torque module is configured to set the predicted torque to zero for at least a predetermined period after the rate of change of the speed of the engine decreases.

In further features, the predicted torque module is configured to set the predicted torque to zero until both: at least a predetermined period passes after the rate of change of the speed of the engine decreases; and a magnitude of the rate of change of the speed of the engine is greater than a predetermined rate of change.

In further features, the predicted torque module is configured to adjust the predicted torque toward a requested torque output of the engine at a predetermined rate in response to a determination that both: at least the predetermined period has passed after the rate of change of the speed of the engine decreased; and the magnitude of the rate of change of the speed of the engine is greater than the predetermined rate of change.

In further features, the predicted torque module is configured to adjust the predicted torque toward the requested torque output of the engine until the upshift of the transmission is complete.

In further features, the predicted torque module is configured to adjust the predicted torque toward the requested torque output of the engine until a difference between the torque output of the engine and the requested torque output of the engine is less than a predetermined difference.

In further features, a predicted speed module is configured to determine a predicted speed of the engine. The selection module is further configured to, based on whether the gear shift of the transmission of the vehicle is occurring, set a selected engine speed to one of: a measured speed of the engine; and the predicted speed of the engine. The sound control module is configured to determine the frequencies for outputting the predetermined engine sound based on the selected engine speed.

In further features, a tachometer control module configured to control a speed displayed by a tachometer within the passenger cabin of the vehicle based on the predicted speed of the engine.

In further features, the sound control module is configured to: when a gear shift of the transmission is occurring: set the selected torque to the predicted torque output of the engine; and set the selected engine speed to the predicted speed of the engine; and when no gear shifts of the transmission are occurring: set the selected torque to the torque output of the engine; and set the selected engine speed to the measured speed of the engine.

In further features, a predicted torque module is configured to set the predicted torque to a requested torque output of the engine during a downshift of the transmission. The selection module is configured to set the selected torque to the predicted torque output of the engine during the downshift.

In further features, a predicted speed module is configured to determine a predicted speed of the engine. A predicted torque module is configured to set the predicted torque to the torque output of the engine during a downshift of the transmission until a difference between the predicted speed of the engine and a measured speed of the engine is greater than a predetermined difference.

In further features, the predicted torque module is configured to adjust the predicted torque toward a requested torque output of the engine at a predetermined rate in response to a determination that the difference is greater than the predetermined difference.

In further features, the predicted torque module is configured to adjust the predicted torque toward the requested torque output of the engine until the downshift of the transmission is complete.

In further features, the predicted torque module is configured to adjust the predicted torque toward the requested torque output of the engine until a second difference between the torque output of the engine and the requested torque output of the engine is less than a second predetermined difference.

In further features, a predicted torque module configured to: selectively set the predicted torque to the torque output of the engine during an upshift of the transmission; and selectively set the predicted torque to a requested torque output of the engine during a downshift of the transmission. The selection module is configured to: set the selected torque to the predicted torque output of the engine during the upshift; and set the selected torque to the predicted torque output of the engine during the downshift.

In a feature, a vehicle audio system includes at least one memory including computer executable instructions at least one processor configured to read and execute the computer executable instructions, the computer executable instructions causing the at least one processor to: based on whether a gear shift of a transmission of the vehicle is occurring, set a selected torque to one of: a torque output of an engine of the vehicle; and a predicted torque output of the engine; determine frequencies for outputting a predetermined engine sound; based on the selected torque, determine magnitudes for outputting the predetermined engine sound at the frequencies, respectively; and apply power to speakers to output sound within a passenger cabin of the vehicle at the magnitudes and frequencies, respectively.

In a feature, a non-transitory computer readable medium includes computer executable instructions, the computer executable instructions configured to cause a processor to perform a method, the method including: based on whether a gear shift of a transmission of the vehicle is occurring, setting a selected torque to one of: a torque output of an engine of the vehicle; and a predicted torque output of the engine; determining frequencies for outputting a predetermined engine sound; based on the selected torque, determining magnitudes for outputting the predetermined engine sound at the frequencies, respectively; and applying power to speakers to output sound within a passenger cabin of the vehicle at the magnitudes and frequencies, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders and generates drive torque. The engine outputs torque to a transmission. The transmission transfers torque to wheels of the vehicle via a driveline. An engine control module (ECM) controls operation of the engine based on a torque request. A transmission control module (TCM) controls gear shifts within the transmission.

An audio visual (A/V) control module of the vehicle outputs sound within a passenger cabin of the vehicle via one or more speakers to enhance engine sound. The A/V control module may, for example, set frequencies for outputting a predetermined sound based on predetermined orders of an engine speed. The A/V control module may also set magnitudes for outputting the predetermined sound at the frequencies, respectively, based on a torque output of the engine. However, the sound output by the A/V control module may vary from expectation during gear shifts of the transmission. Additionally or alternatively, the sound output by the A/V control module may vary from what may be expected given an engine speed displayed by a tachometer.

According to the present disclosure, the A/V control module sets the frequencies for outputting the predetermined sound during gear shifts based on a predicted engine speed. The A/V control module also sets the magnitudes for outputting the predetermined sound at the frequencies, respectively, based on a predicted torque output of the engine. By using the predicted engine speed and the predicted torque better, the A/V control module may provide aural feedback during gear shifts that is better aligned with user expectation given the engine speed displayed by the tachometer.

Figure 1:
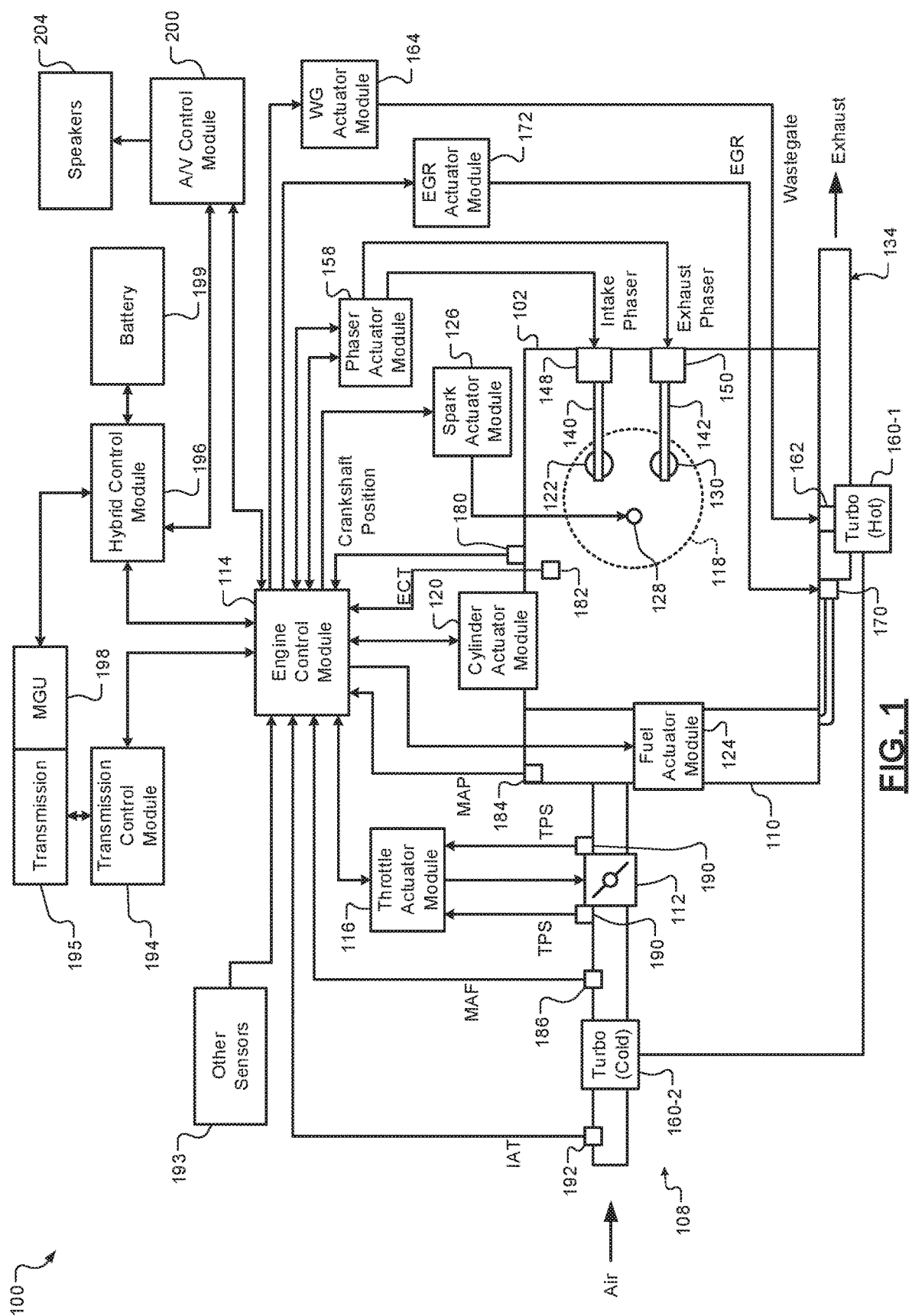
FIG. 1 is a functional block diagram of an example engine system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable in the context of the present application, drawings, and claims. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests. In autonomous or semi-autonomous vehicles, driver input may be generated based on signals from one or more sensors of the vehicle (e.g., light detection and ranging (LIDAR) sensors, cameras, radar sensors, etc.) and/or one or more remote sources.

Under some circumstances, the hybrid control module 196 controls the MGU 198 to output torque, for example, to supplement engine torque output. The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration.

The vehicle also includes an audio visual (A/V) control module 200 that controls sound output via speakers 204 within the passenger cabin of the vehicle. The A/V control module 200 may control the speakers 204 to output sound based on received amplitude modulation (AM) signals, received frequency modulation (FM) signals, received satellite signals, and other types of audio signals. The A/V control module 200 may be implemented, for example, with an infotainment system.

Under some circumstances, the A/V control module 200 additionally or alternatively controls the sound output via the speakers 204 to enhance sound output by the engine 102. The A/V control module 200 may receive parameters from the ECM 114, the hybrid control module 196, the transmission control module 194, and/or one or more other control modules of the vehicle. The A/V control module 200 may receive parameters from other modules, for example, via a controller area network (CAN) bus. As discussed further below, the A/V control module 200 may determine when and the extent to which to output sound for operation of the engine 102 based on one or more of the received parameters.

Figure 2:
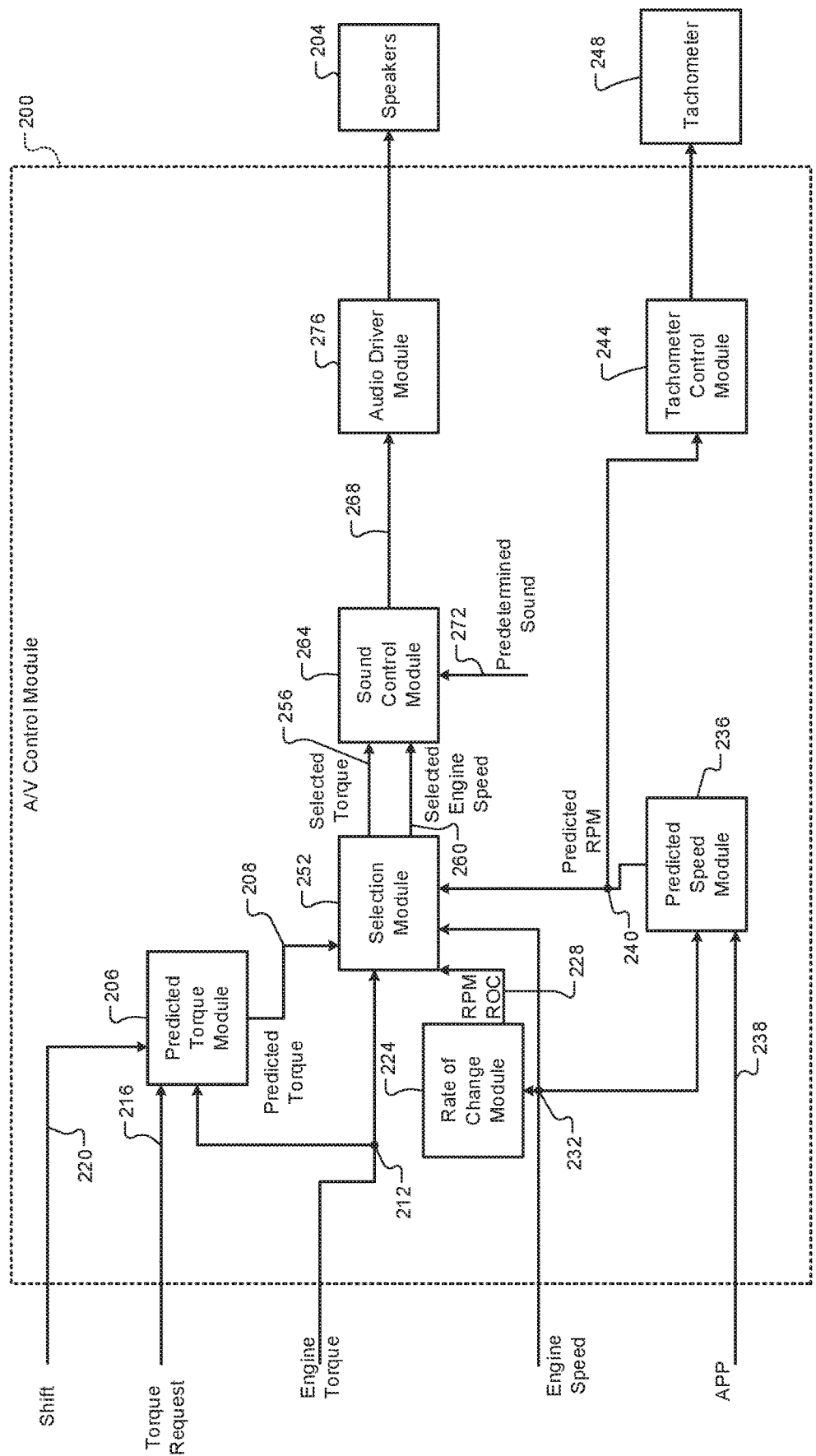
FIG. 2 is a functional block diagram of an example audio system including an audio visual control module and speakers.

FIG. 2 is a functional block diagram of an example audio system including the A/V control module 200 and the speakers 204. The speakers 204 output sound within the passenger cabin of the vehicle.

A predicted torque module 206 determines a predicted torque 208 of the engine 102. The predicted torque module 206 may generally set the predicted torque 208 equal to a present engine torque 212 output of the engine 102. The engine torque 212 may be measured using a torque sensor or determined (e.g., by a torque estimation module of the ECM 114) based on one or more parameters using one or more equations and/or lookup tables that relate the parameter(s) to engine torque. As an example, the torque estimation module may determine the engine torque 212 using a torque relationship such as $$T=f(APC, S, I, E, AF, OT, \#),$$

where engine torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. This relationship may be modeled by an equation and/or may be stored as a lookup table. The torque estimation module may determine the APC based on measured MAF and engine speed, for example, using one or more equations and/or lookup tables that relate MAF and engine speed to APC.

As discussed further below, the predicted torque module 206 may adjust the predicted torque 208 under some circumstances, such as during gear shifts. For example, the predicted torque module 206 may transition the predicted torque 208 to zero during downshifts and may transition the predicted torque 208 to a torque request 216 for the engine 102 during upshifts. The ECM 114 may control the engine actuators to achieve the torque request 216. The torque request 216 may be set (e.g., by the ECM 114) based on the driver input.

The transmission control module 194 may generate a shift signal 220 that indicates when the transmission control module 194 is shifting a gear ratio of the transmission 195. The transmission control module 194 also generates the shift signal 220 to indicate whether the shift is an upshift or a downshift. Upshifts include shifts from a lower gear to a higher gear, such as from a second gear to a third gear. Downshifts include shifts from a higher gear to a lower gear, such as from the third gear to the second gear.

A rate of change module 224 determines a rate of change (ROC) 228 in an engine speed 232 (RPM ROC) based on a difference between a present value of the engine speed 232 and a previous (e.g., last) value of the engine speed 232. The ECM 114 may determine the engine speed 232 based on the crankshaft position measured using the crankshaft position sensor 180. For example, the ECM 114 may set the engine speed 232 based on a change in the crankshaft position over time.

A predicted speed module 236 determines a predicted engine speed (predicted RPM) 240. The predicted speed module 236 may determine the predicted engine speed 240, for example, based on the engine speed 232 and an APP 238 measured using the APP sensor. The predicted speed module 236 may determine the predicted engine speed 240, for example, using one or more equations and/or lookup tables that relate APPs and engine speeds to predicted engine speeds 240. Further details regarding generating the predicted engine speed can be found, for example, in commonly assigned U.S. patent application Ser. No. 15/234,723, titled "Predictive Tachometer Profile Generating During Idle Revving Events" and U.S. patent application Ser. No. 15/220,912, titled "Predictive Tachometer Profile Generation During Transmission Shift Events."

A tachometer control module 244 controls a tachometer 248 to display the predicted engine speed 240 within the passenger cabin to a driver of the vehicle. The tachometer 248 may be an analog tachometer or a digital tachometer. In various implementations, the tachometer 248 may include a display and the tachometer 248 may display the predicted engine speed 240 on the display.

A selection module 252, based on whether a shift of the transmission 195 is occurring, sets a selected torque 256 to one of the engine torque 212 and the predicted torque 208. Based on whether a shift of the transmission 195 is occurring, the selection module 252 also sets a selected engine speed 260 to one of the engine torque 212 and the predicted torque 208. Specifically, as discussed further below, the selection module 252 sets the selected torque 256 and the selected engine speed 260 to the predicted torque 208 and the predicted engine speed 240, respectively, when a shift of the transmission 195 is occurring. The selection module 252 sets the selected torque 256 and the selected engine speed 260 to the engine torque 212 and the engine speed 232 when a shift of the transmission 195 is not occurring.

A sound control module 264 sets characteristics 268 for outputting a predetermined engine sound 272 based on the selected torque 256 and the selected engine speed 260. The characteristics 268 at a given time include magnitudes (e.g., in dB) for outputting the predetermined engine sound 272 at predetermined orders, respectively, of a frequency corresponding to the selected engine speed 260. For example only, the predetermined orders may include, but are not limited to, 0.5, 1, 1.5, 2, 2.5, 3, 3.5, 4, 4.5, 5, 5.5, 6, 6.5, 7, 7.5, and $8^{th}$ orders of the frequency corresponding to the selected engine speed 260. The predetermined orders, however, may include one or more other orders. The characteristics 268 also include the frequencies at which to output the predetermined engine sound 272 corresponding to the predetermined orders, respectively, of the frequency corresponding to the selected engine speed 260. While the example of one predetermined engine sound will be discussed, the characteristics 268 may include the same information (magnitudes for respective frequencies) for multiple different predetermined engine sounds. A sound file for the predetermined engine sound 272 (or tones) is stored in memory.

The sound control module 264 determines the frequencies based on the predetermined orders of the frequency corresponding to the selected engine speed 260. The sound control module 264 determines the magnitudes for the frequencies, respectively, based on the selected torque 256. For example, the sound control module 264 may determine the magnitudes for outputting the predetermined engine sound 272 using a lookup table of magnitudes for outputting the predetermined engine sound 272 at the predetermined orders indexed by engine torque. An example illustration of such a lookup table is provided below merely as an illustrative aid.

| T | | | | O | | | | |
|---|---|---|---|---|---|---|---|---|
| V | 0.5 | 1.0 | 1.5 | 2.0 | 2.5 | 3.0 | 3.5 | ... |
| T1 | M1, 0.5 | M1, 1 | M1, 1.5 | M1, 2 | M1, 2.5 | M1, 3 | M1, 3.5 | ... |
| T2 | M2, 0.5 | M2, 1 | M2, 1.5 | M2, 2 | M2, 2.5 | M2, 3 | M2, 3.5 | |
| . | | | | | | | | |
| . | | | | | | | | |
| . | | | | | | | | |

The top row lists predetermined orders (O) of the frequency corresponding to the selected engine speed 260. For example, 0.5 corresponds to the 0.5th order of the frequency corresponding to the selected engine speed 260, 1.0 corresponds to the first order of the frequency corresponding to the selected engine speed 260, and so on. Each row of the lookup table is associated with a possible engine torque T and includes magnitudes (M) for outputting the predetermined engine sound 272 at the respective predetermined orders. For example, for engine torque T1, output the predetermined engine sound 272 at the 0.5th order of the frequency corresponding to the selected engine speed 260 having the magnitude M1, 0.5, output the predetermined engine sound 272 at the first (1.0) order of the frequency corresponding to the selected engine speed 260 having the magnitude M1, 1, output the predetermined engine sound 272 at the 1.5th order of the frequency corresponding to the selected engine speed 260 having the magnitude M1, 1.5, and so on.

An audio driver module 276 applies power (e.g., from the one or more other batteries) to the speakers 204 to output sound (e.g., the acceleration sound, the regeneration sound) according to the characteristics 268. More specifically, the audio driver module 276 applies power to output the predetermined engine sound 272 at the frequencies (corresponding to the selected engine speed 260) and the magnitudes, respectively.

Figure 3:
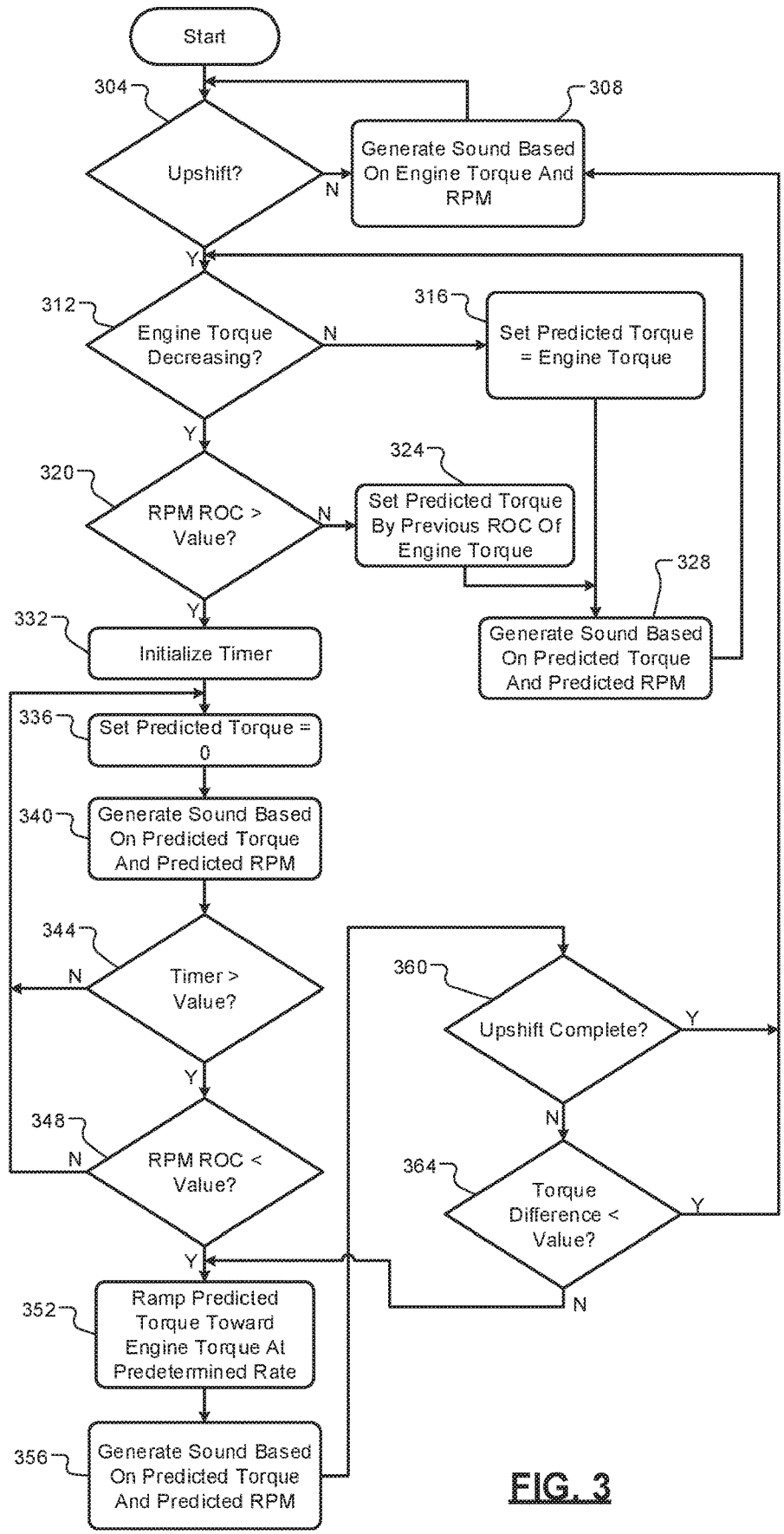
FIG. 3 is a flowchart depicting an example method of outputting sound to enhance engine sound production for an upshift of a transmission.

FIG. 3 is a flowchart depicting an example method of outputting the predetermined engine sound 272 for an upshift of the transmission 195. Control begins with 304 where the selection module 252 determines whether an upshift of the transmission 195 is occurring. The selection module 252 may determine whether an upshift is occurring, for example, based on the shift signal 220. If 304 is false, the selection module 252 sets the selected torque 256 to the engine torque 212 and sets the selected engine speed 260 to the engine speed 232, and control continues with 308. At 308, the sound control module 264 generates the characteristics 268 based on the selected torque 256 and the selected engine speed 260 and the audio driver module 276 applies power to the speakers 204 according to the characteristics 268. The predetermined engine sound 272 is therefore output at frequencies and magnitudes set based on the engine speed 232 and the engine torque 212 at 308. If 304 is true, the selection module 252 sets the selected torque 256 to the predicted torque 208 and sets the selected engine speed 260 to the predicted engine speed 240, and control continues with 312.

At 312, the predicted torque module 206 determines whether the engine torque 212 is decreasing (e.g., whether a magnitude of a rate of change of the engine torque 212 is greater than a predetermined value. If 312 is false, the predicted torque module 206 sets the predicted torque 208 to the engine torque 212 at 316, and control continues with 328, which is discussed further below. If 312 is true, control continues with 320.

At 320, the predicted torque module 206 determines whether the magnitude of the engine speed ROC 228 is greater than a predetermined ROC. The predetermined ROC is calibratable and is greater than zero. In various implementations, the engine speed ROC 228 may be compared with the predetermined ROC and the predetermined ROC may be a negative value. If 320 is true, control continues with 332, which is discussed further below. If 320 is false, the predicted torque module 206 adjusts the predicted torque 208 by a rate of change of the engine torque 212 immediately before the engine torque 212 started to decrease (when 312 became true) at 324, and control continues with 328. The predicted torque module 206 therefore maintains the predicted torque 208 on the trajectory of the engine torque 212 immediately before the engine torque 212 started to decrease until the engine speed ROC 228 decreases.

At 328, the sound control module 264 generates the characteristics 268 based on the selected torque 256 and the selected engine speed 260 and the audio driver module 276 applies power to the speakers 204 according to the characteristics 268. The predetermined engine sound 272 is therefore output at frequencies and magnitudes set based on the predicted engine speed 240 and the predicted torque 208 at 328. Control returns to 312.

At 332, the predicted torque module 206 initializes a timer value to a predetermined initialization value. For example, the predetermined initialization value may be zero, and a timer module may increment the timer value as time passes. The predicted torque module 206 sets the predicted torque 208 to zero at 336. The predicted torque module 206 therefore rapidly transitions the predicted torque 208 to zero when the engine speed 232 decreases.

At 340, the sound control module 264 generates the characteristics 268 based on the selected torque 256 and the selected engine speed 260 and the audio driver module 276 applies power to the speakers 204 according to the characteristics 268. The predetermined engine sound 272 is therefore output at frequencies and magnitudes set based on the predicted engine speed 240 and the predicted torque 208 (then zero) at 340. Control continues with 344.

At 344, the predicted torque module 206 determines whether the timer value is greater than a predetermined minimum value. The predetermined minimum value is calibratable and may be set, for example, based on a period to maintain the predicted torque 336 at zero for the upshift. If 344 is false, control returns to 336 to maintain the predicted torque 336 at zero. If 344 is true, control continues with 348.

At 348, the predicted torque module 206 determines whether the magnitude of the engine speed ROC 228 is less than the predetermined ROC. If 348 is true, control continues with 352. If 348 is false, control returns to 336 to maintain the predicted torque 208 at zero. The predicted torque module 206 therefore maintains the predicted torque 208 at zero until at least the predetermined minimum value of time has passed and the engine speed 232 stops decreasing by more than the predetermined ROC.

At 352, the predicted torque module 206 adjusts (increases) the predicted torque 208 toward the torque request 216 by up to a predetermined amount of a predetermined rate limit. The predetermined amount of the predetermined rate limit is calibratable and is greater than zero. If the difference between the predicted torque 208 and the torque request 216 is less than the predetermined amount, the predicted torque module 206 adjusts the predicted torque 208 to the torque request 216.

The sound control module 264 generates the characteristics 268 based on the selected torque 256 and the selected engine speed 260 and the audio driver module 276 applies power to the speakers 204 according to the characteristics 268 at 356. The predetermined engine sound 272 is therefore output at frequencies and magnitudes set based on the predicted engine speed 240 and the predicted torque 208 at 356. Control continues with 360.

At 360, the selection module 252 determines whether the upshift is complete. If 360 is true, the selection module 252 sets the selected torque 256 to the engine torque 212 and sets the selected engine speed 260 to the engine speed 232, and control continues with 308, as discussed above. If 360 is false, control may continue with 364.

At 364, the selection module 252 determines whether a difference between the torque request 216 and the engine torque 212 is less than a predetermined difference. If 364 is true, the selection module 252 sets the selected torque 256 to the engine torque 212 and sets the selected engine speed 260 to the engine speed 232, and control continues with 308, as discussed above. If 364 is false, control may return to 352, as discussed above.

Figure 4:
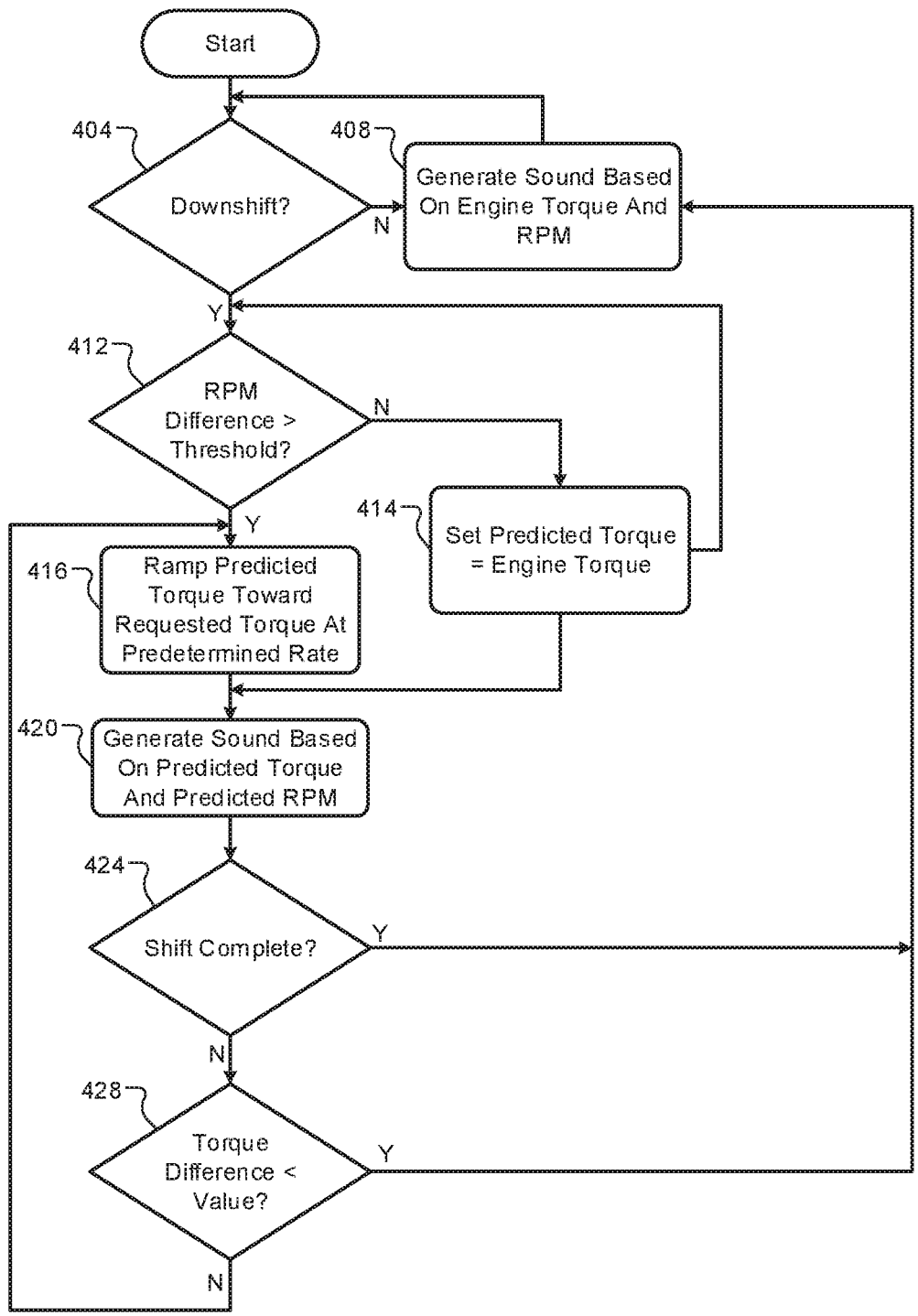
FIG. 4 is a flowchart depicting an example method of outputting sound to enhance engine sound production for a downshift of a transmission.

FIG. 4 is a flowchart depicting an example method of outputting the predetermined engine sound 272 for a downshift of the transmission 195. Control begins with 404 where the selection module 252 determines whether a downshift of the transmission 195 is occurring. The selection module 252 may determine whether a downshift is occurring, for example, based on the shift signal 220. If 404 is false, the selection module 252 sets the selected torque 256 to the engine torque 212 and sets the selected engine speed 260 to the engine speed 232, and control continues with 408. At 408, the sound control module 264 generates the characteristics 268 based on the selected torque 256 and the selected engine speed 260 and the audio driver module 276 applies power to the speakers 204 according to the characteristics 268. The predetermined engine sound 272 is therefore output at frequencies and magnitudes set based on the engine speed 232 and the engine torque 212 at 408. If 404 is true, the selection module 252 sets the selected torque 256 to the predicted torque 208 and sets the selected engine speed 260 to the predicted engine speed 240, and control continues with 412.

At 412, the predicted torque module 206 determines whether a difference between the predicted engine speed 240 and the engine speed 232 is greater than a predetermined value. In other words, the predicted torque module 206 determines whether the predicted engine speed 240 is greater than the the engine speed 232 by at least the predetermined value.

If 412 is false, the predicted torque module 206 sets the predicted torque 208 to the engine torque 212 at 414, and control continues with 420. If 412 is true, the predicted torque module 206 adjusts (increases) the predicted torque 336 toward the torque request 216 by up to a second predetermined amount of a second predetermined rate limit. The second predetermined amount of the second predetermined rate limit is calibratable and is greater than zero. If the difference between the predicted torque 208 and the torque request 216 is less than the predetermined amount, the predicted torque module 206 adjusts the predicted torque 208 to the torque request 216.

The sound control module 264 generates the characteristics 268 based on the selected torque 256 and the selected engine speed 260 and the audio driver module 276 applies power to the speakers 204 according to the characteristics 268 at 420. The predetermined engine sound 272 is therefore output at frequencies and magnitudes set based on the predicted engine speed 240 and the predicted torque 208 at 420. Control continues with 424.

At 424, the selection module 252 determines whether the downshift is complete. If 424 is true, the selection module 252 sets the selected torque 256 to the engine torque 212 and sets the selected engine speed 260 to the engine speed 232, and control continues with 408, as discussed above. If 424 is false, control may continue with 428.

At 428, the selection module 252 determines whether the difference between the torque request 216 and the engine torque 212 is less than a second predetermined difference. If 428 is true, the selection module 252 sets the selected torque 256 to the engine torque 212 and sets the selected engine speed 260 to the engine speed 232, and control continues with 408, as discussed above. If 364 is false, control may return to 416, as discussed above.

In various implementations, the predicted torque module 206 may maintain the predicted torque 208 at the torque request 216 during the downshift from when 404 is true until 424 or 428 is true.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An audio system of a vehicle, comprising:
   a selection module configured to, based on whether a gear shift of a transmission of the vehicle is occurring, set a selected torque to one of:
      a torque output of an engine of the vehicle; and
      a predicted torque output of the engine;
   a sound control module configured to:
      determine frequencies for outputting a predetermined engine sound; and
      based on the selected torque, determine magnitudes for outputting the predetermined engine sound at the frequencies, respectively;
   an audio driver module is configured to apply power to speakers to output sound within a passenger cabin of the vehicle at the magnitudes and frequencies, respectively; and
   a predicted torque module configured to set the predicted torque to the torque output of the engine during an upshift of the transmission until the torque output of the engine decreases,
   wherein the predicted torque module is configured to, when a decrease in the torque output of the engine is greater than a predetermined decrease, adjust the predicted torque by a rate of change of the torque output of the engine from before the torque output of the engine began to decrease, and
   wherein the selection module is configured to set the selected torque to the predicted torque output of the engine during the upshift.

2. The audio system of claim 1 wherein the predicted torque module is configured to adjust the predicted torque by the rate of change of the torque output of the engine until a rate of change of a speed of the engine decreases.

3. The audio system of claim 2 wherein the predicted torque module is configured to set the predicted torque to zero for at least a predetermined period after the rate of change of the speed of the engine decreases.

4. The audio system of claim 2 wherein the predicted torque module is configured to set the predicted torque to zero until both:
   at least a predetermined period passes after the rate of change of the speed of the engine decreases; and
   a magnitude of the rate of change of the speed of the engine is greater than a predetermined rate of change.

5. The audio system of claim 4 wherein the predicted torque module is configured to adjust the predicted torque toward a requested torque output of the engine at a predetermined rate in response to a determination that both:
   at least the predetermined period has passed after the rate of change of the speed of the engine decreased; and
   the magnitude of the rate of change of the speed of the engine is greater than the predetermined rate of change.

6. The audio system of claim 5 wherein the predicted torque module is configured to adjust the predicted torque toward the requested torque output of the engine until the upshift of the transmission is complete.

7. The audio system of claim 5 wherein the predicted torque module is configured to adjust the predicted torque toward the requested torque output of the engine until a difference between the torque output of the engine and the requested torque output of the engine is less than a predetermined difference.

8. The audio system of claim 1 further comprising:
a predicted speed module configured to determine a predicted speed of the engine;
wherein the selection module is further configured to, based on whether the gear shift of the transmission of the vehicle is occurring, set a selected engine speed to one of:
a measured speed of the engine; and
the predicted speed of the engine, and
wherein the sound control module is configured to determine the frequencies for outputting the predetermined engine sound based on the selected engine speed.

9. An audio visual system comprising:
the audio system of claim 8; and
a tachometer control module configured to control a speed displayed by a tachometer within the passenger cabin of the vehicle based on the predicted speed of the engine.

10. The audio system of claim 8 wherein the sound control module is configured to:
when a gear shift of the transmission is occurring:
set the selected torque to the predicted torque output of the engine; and
set the selected engine speed to the predicted speed of the engine; and
when no gear shifts of the transmission are occurring:
set the selected torque to the torque output of the engine; and
set the selected engine speed to the measured speed of the engine.

11. The audio system of claim 1 wherein the predicted torque module is further configured to set the predicted torque to a requested torque output of the engine during a downshift of the transmission,
wherein the selection module is configured to set the selected torque to the predicted torque output of the engine during the downshift.

12. The audio system of claim 1 further comprising:
a predicted speed module configured to determine a predicted speed of the engine,
wherein the predicted torque module is further configured to set the predicted torque to the torque output of the engine during a downshift of the transmission until a difference between the predicted speed of the engine and a measured speed of the engine is greater than a predetermined difference.

13. The audio system of claim 12 wherein the predicted torque module is configured to adjust the predicted torque toward a requested torque output of the engine at a predetermined rate in response to a determination that the difference is greater than the predetermined difference.

14. The audio system of claim 13 wherein the predicted torque module is configured to adjust the predicted torque toward the requested torque output of the engine until the downshift of the transmission is complete.

15. The audio system of claim 13 wherein the predicted torque module is configured to adjust the predicted torque toward the requested torque output of the engine until a second difference between the torque output of the engine and the requested torque output of the engine is less than a second predetermined difference.

16. The audio system of claim 1 wherein:
the predicted torque module is configured to:
selectively set the predicted torque to the torque output of the engine during an upshift of the transmission; and
selectively set the predicted torque to a requested torque output of the engine during a downshift of the transmission; and
the selection module is configured to:
set the selected torque to the predicted torque output of the engine during the upshift; and
set the selected torque to the predicted torque output of the engine during the downshift.

17. A vehicle audio system, comprising:
at least one memory comprising computer executable instructions;
at least one processor configured to read and execute the computer executable instructions, the computer executable instructions causing the at least one processor to:
based on whether a gear shift of a transmission of the vehicle is occurring, set a selected torque to one of:
a torque output of an engine of the vehicle; and
a predicted torque output of the engine,
wherein the setting of the selected torque includes setting the selected torque to the predicted torque output of the engine during an upshift of the transmission;
determine frequencies for outputting a predetermined engine sound;
based on the selected torque, determine magnitudes for outputting the predetermined engine sound at the frequencies, respectively; and
apply power to speakers to output sound within a passenger cabin of the vehicle at the magnitudes and frequencies, respectively;
set the predicted torque to the torque output of the engine during the upshift of the transmission until the torque output of the engine decreases;
when a decrease in the torque output of the engine is greater than a predetermined decrease, adjust the predicted torque by a rate of change of the torque output of the engine from before the torque output of the engine began to decrease; and
set the selected torque to the predicted torque output of the engine during the upshift.

18. A non-transitory computer readable medium comprising computer executable instructions, the computer executable instructions configured to cause a processor to perform a method, the method comprising:
based on whether a gear shift of a transmission of a vehicle is occurring, setting a selected torque to one of:
a torque output of an engine of the vehicle; and
a predicted torque output of the engine,
wherein the setting of the selected torque includes setting the selected torque to the predicted torque output of the engine during an upshift of the transmission;
determining frequencies for outputting a predetermined engine sound;
based on the selected torque, determining magnitudes for outputting the predetermined engine sound at the frequencies, respectively;
applying power to speakers to output sound within a passenger cabin of the vehicle at the magnitudes and frequencies, respectively;
setting the predicted torque to the torque output of the engine during the upshift of the transmission until the torque output of the engine decreases;

when a decrease in the torque output of the engine is greater than a predetermined decrease, adjusting the predicted torque by a rate of change of the torque output of the engine from before the torque output of the engine began to decrease; and setting the selected torque to the predicted torque output of the engine during the upshift.

19. An audio system of a vehicle, comprising:

a selection module configured to, based on whether a gear shift of a transmission of the vehicle is occurring, set a selected torque to one of:
 a torque output of an engine of the vehicle; and
 a predicted torque output of the engine;

a sound control module configured to:
 determine frequencies for outputting a predetermined engine sound; and
 based on the selected torque, determine magnitudes for outputting the predetermined engine sound at the frequencies, respectively;

an audio driver module is configured to apply power to speakers to output sound within a passenger cabin of the vehicle at the magnitudes and frequencies, respectively;

a predicted speed module configured to determine a predicted speed of the engine; and a predicted torque module configured to set the predicted torque to the torque output of the engine during a downshift of the transmission until a difference between the predicted speed of the engine and a measured speed of the engine is greater than a predetermined difference, wherein the predicted torque module is configured to adjust the predicted torque toward a requested torque output of the engine at a predetermined rate in response to a determination that the difference is greater than the predetermined difference, and wherein the predicted torque module is configured to adjust the predicted torque toward the requested torque output of the engine until a second difference between the torque output of the engine and the requested torque output of the engine is less than a second predetermined difference.

* * * * *